(12) United States Patent
Murray (10) Patent No.: US 11,108,623 B2
(45) Date of Patent: Aug. 31, 2021

(54) RAPID OWNER SELECTION

(71) Applicant: HEWLETT PACKARD ENTERPRISE DEVELOPMENT LP, Houston, TX (US)

(72) Inventor: Christopher Murray, Boynton Beach, FL (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 9 days.

(21) Appl. No.: 16/258,050

(22) Filed: Jan. 25, 2019

(65) Prior Publication Data
US 2020/0244516 A1 Jul. 30, 2020

(51) Int. Cl.
| | |
|---|---|
| H04L 12/26 | (2006.01) |
| H04L 12/437 | (2006.01) |
| H04L 12/24 | (2006.01) |
| H04L 12/46 | (2006.01) |
| H04L 12/931 | (2013.01) |
| H04L 12/64 | (2006.01) |

(52) U.S. Cl.
CPC ...... H04L 41/0668 (2013.01); H04L 12/4641 (2013.01); H04L 43/0811 (2013.01); H04L 49/70 (2013.01); H04L 2012/6437 (2013.01)

(58) Field of Classification Search
None
See application file for complete search history.

(56) References Cited

U.S. PATENT DOCUMENTS

| | | | |
|---|---|---|---|
| 9,276,767 B2 | 3/2016 | Bos et al. | |
| 2010/0165883 A1* | 7/2010 | Holness | H04L 45/28 370/255 |
| 2011/0026439 A1 | 2/2011 | Rollins | |
| 2011/0075554 A1 | 3/2011 | Holness | |
| 2012/0224471 A1* | 9/2012 | Vinod | H04L 12/437 370/222 |
| 2013/0201820 A1* | 8/2013 | Xiaoyong | H04L 41/06 370/220 |
| 2013/0343179 A1* | 12/2013 | Madaiah | H04L 41/0654 370/222 |

(Continued)

FOREIGN PATENT DOCUMENTS

WO  WO-2014079010  5/2014

OTHER PUBLICATIONS

Ruijie Ethernet Ring Protection Switching, (White Paper), Retrieved Dec. 6, 2018, 12 Pgs.

(Continued)

*Primary Examiner* — Duc T Duong
(74) *Attorney, Agent, or Firm* — Nolte Lackenbach Siegel (57) ABSTRACT

Systems and methods address automated ring owner selection for a ring topology network. A new ring owner may be selected based on failure of a current ring owner. The new ring owner may assume a ring ownership role by a) detecting a missing Ownership Select Message (OSM); b) detecting missing Continuity Check Protocol (CCP) messages; and c) determining that the current ring owner is an adjacent network module connected via an external link of a management network. A signal fail (SF) condition may also be present. Upon detection of adequate role changing conditions, a new ring owner may assume a ring ownership role, transmit an OSM and possibly select a new active uplink.

20 Claims, 8 Drawing Sheets

(56) References Cited

U.S. PATENT DOCUMENTS

| | | | |
|---|---|---|---|
| 2015/0085637 A1* | 3/2015 | Nahlous | H04L 45/28 370/217 |
| 2016/0050103 A1* | 2/2016 | Kariya | H04L 41/0654 370/222 |
| 2016/0204976 A1* | 7/2016 | Singh | H04L 12/40 370/216 |
| 2017/0180153 A1* | 6/2017 | Subramaniam | H04L 43/50 |
| 2017/0222830 A1* | 8/2017 | Yasuda | H04L 12/437 |
| 2017/0302473 A1* | 10/2017 | Tochio | H04L 45/22 |
| 2019/0020500 A1* | 1/2019 | She | H04L 41/12 |

OTHER PUBLICATIONS

Understanding Ethernet Ring Protection Switching Functionality, (Web Page), Sep. 3, 2018, 9 Pgs.

* cited by examiner

G.8032 RAPID OWNER CHANGE
PSEUDOCODE EXAMPLE

```
IF FLM ADJACENT TO OWNER AND EXTERNAL LINK DOWN (NO SIGNAL)
THEN
        IF 0 CCP MESSAGES RECEIVED AND
                NO OWNER MESSAGE IN THE LAST SECOND AND
                RECEIVING SIGNAL FAIL AND
                SENDING SIGNAL FAIL
        THEN
                BECOME OWNER
                IF ACTIVE UPLINK NOT ON FLM OWNER NODE
                        KEEP UPLINK ENABLED
                ELSE
                        SELECT NEW UPLINK
                ENDIF
        ENDIF
ENDIF
```

RAPID OWNER SELECTION

BACKGROUND

In the field of scalable compute resources, network connectivity between nodes, blades, or frames of adjacent network modules may represent a primary communication path for sharing data between those nodes. The data may represent inputs to compute process (e.g., data or applications), outputs of compute resources (e.g., compute results), communications to coordinate distributed processes, and other types of data. In some architectures, adjacent nodes of network modules within a blade server, cluster, or frame may be expected to be directly connected to each other using a control network to exchange coordination information amongst the set of devices working, together. This control network may be isolated from regular data traffic using a separate physical local area network (LAN) or logical network (e.g., virtual local area network VLAN).

In some networks, the control network may be logically (or physically) configured as a ring network. That is, the ring network may be a loop where each node communicates to exactly one upstream and one downstream neighbor so that all communications pass around the ring topology. To control data traffic and prevent network loops, some ring topology implementations have a ring owner. There may be only a single ring owner at a given point in time. Upon failure of a ring owner a new ring owner is selected (often involving manual intervention). Additionally, some scalable compute resources, may maintain a single active uplink from the group of resources and have multiple backup uplinks. Because of considerations similar to that of having only one ring owner, having a single active uplink means that, upon failure of an active uplink, a new single active uplink may be selected (from a set of available backups) responsive to detection of that failure. Heartbeat style messaging may be implemented to share coordination and status information across nodes working together.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not perform serial processing and therefore those functions may be performed in an order different than shown or possibly in parallel with each other. For a detailed description of various examples, reference will now be made to the accompanying drawings, in which.

DETAILED DESCRIPTION

Illustrative examples of the subject matter claimed below will now be disclosed. In the interest of clarity, not all features of an actual implementation are described for every example implementation in this disclosure. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

According to the International Telecommunication Union (ITU) G.8032 standard, the Ring Protection Layer (RPL) owner node is chosen statically. In some networks, that network may not start until a technician selects (e.g., manually selects) the RPL owner. A configuration utility (e.g., user-interactive utility) may be provided so that a technician may choose a node in the ring and designate it as the RPL owner. Solutions that exist today are most likely based on user intervention either at initial startup or in reaction to failure of a ring owner node. Further, all networked modules are expected to be in a ring topology at initialization.

In addition to the ring owner selection, a ring will typically have only a single active uplink to a customer network that is selected independently of the G.8032. Disclosed techniques, in some implementations, provide an integrated G.8032 protocol owner (i.e., ring owner) selection and the active uplink selection. This disclosure explains a method and system to automatically (without manual intervention as mentioned above) select a new ring owner based, in part, on missed heartbeat messages. In an example implementation, the automatic selection may take less than 2 seconds (which may be configurable for different implementations) in response to the current ring being removed, rebooted, or otherwise becoming non-responsive (or missing based on no heartbeat messages being received). In some example implementations, the active uplink management may also be relocated to the newly selected owner. In a situation where the failed node was previously both the ring owner and the active uplink, the new ring owner may select a new active uplink (e.g., from a list of available uplinks)

As explained in more detail below, there may be both a management network and a customer network supported by a scaleable compute resource (See FIG. 1). In some implementations, all network modules in a ring topology configure a network management VLAN (4095) so that VLAN 4095, in this example, is configured for the ring ports and the CPU Management port. This management VLAN may then provide a communication path to allow all the network modules to communicate over a private connection. Thus, the private connection allows for management without any data being received by any other modules connected to the network module switch including the customer data network. In this type of configuration, all network nodes may be running the G.8032 protocol and use VLAN 4095 to communicate with each other.

Figure 1:
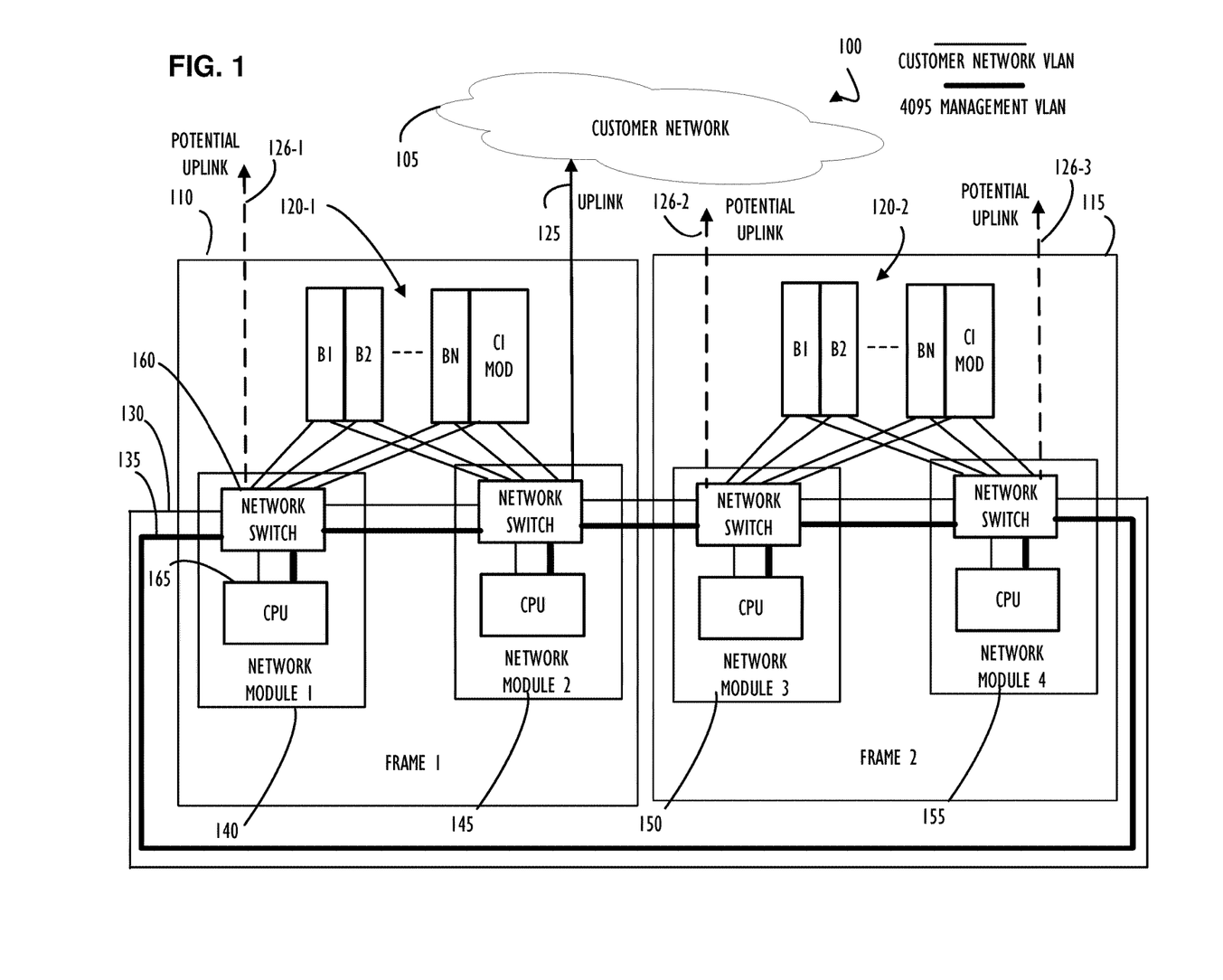
FIG. 1 is a functional block diagram of a computer infrastructure including multiple frame scaleable compute resources, a customer VLAN, and a management VLAN, according to one or more disclosed implementations.
Figure 2:
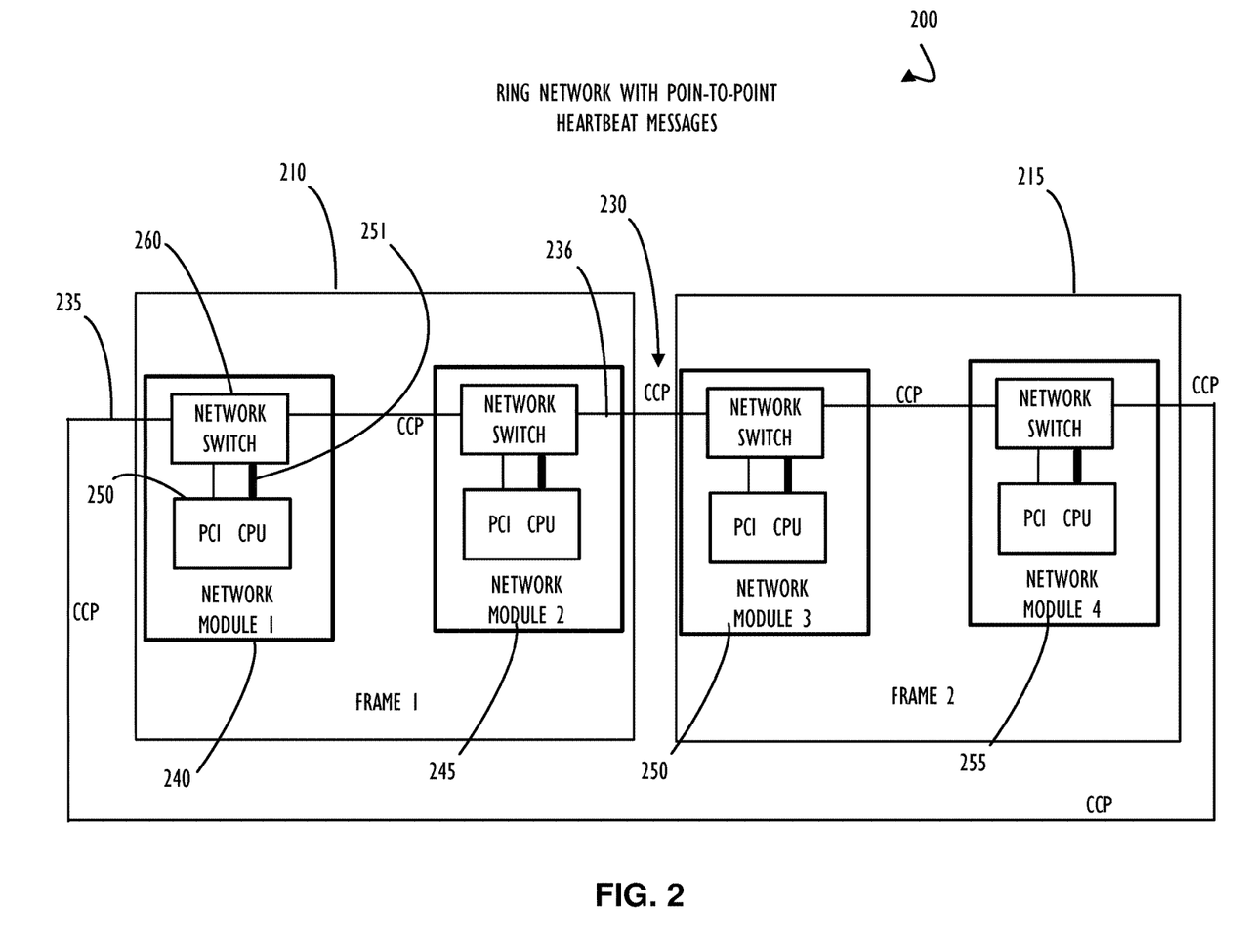
FIG. 2 is a functional block diagram representing an example of a ring network with point-to-point heartbeat messaging (e.g., control and coordination signals), according to one or more disclosed implementations.

In the disclosed example techniques for automatic ring owner selection, there may be at least four protocols that execute on each network module CPU over the management VLAN 4095 (FIGS. 1 and 2). Four example protocols may include:
1. Continuity Check Protocol (CCP)—The CCP protocol, in this example, is a point-to-point protocol that sends messages between the network module and each of its direct neighbors. In some disclosed implementations, each CCP packet will not travel farther than the direct neighbor network module.
2. Owner Selection Protocol (OSP)—The OSP protocol may assist disclosed techniques to select an owner in the G.8032 network when one does not exist. In some implementations, the G.8032 protocol will also send an OSP message periodically to advertise that there is currently an owner designation for an active ring owner.
3. G.8032 protocol—The loop prevention protocol. The owner of the G.8032 network (i.e., a ring network) disables a link to prevent any loop in the network. In some implementations, this protocol may be extended over the standard G.8032 protocol.
4. Management Port Selection Protocol—This protocol may be used, for example, by the ring owner to select the active uplink or to advertise that a new uplink may be needed. Other nodes may also use this protocol to send a message to the ring owner stating that they have an uplink available to use (e.g., a registration process to "get in line"). Please note that in other literature an "uplink," as used herein, may be referred to as a "management port" or an "uplink port" and should not be confused with the discussed CPU management port 251 discussed below.

Having an understanding of the above overview, this disclosure now explains at least one non-limiting example implementation (and possible variants thereof). This example implementation is explained with reference to the figures that include: a first functional block diagram of a system including multiple nodes of a scaleable resource that may benefit from the concepts of this disclosure (FIG. 1); a second functional block diagram focusing on the management network of the scaleable resource example from FIG. 1 (FIG. 2); Four figures to illustrate a possible failure scenario and automatic new ring owner selection based, in part, on sample pseudo-code (FIGS. 3A-3D); one example method for automatically selecting a new ring owner responsive to failure (FIG. 4); and an example computing device instrumented with computer instructions to perform the method of FIG. 4 (FIG. 5) (all according to different possible disclosed implementations).

Referring to FIG. 1, an example computer infrastructure 100 is illustrated. In this example, customer network 105 is connected to a set of frames (represented by frame 1 (110), and frame 2 (115)). Of course, more than two frames may be present but for simplicity of this disclosure only two are shown in this example. As indicated by arrow 120-1, frame 1 may be configured with a set of blades (B1, B2, . . . BN) and a Composable Infrastructure (CI) module. Similarly, arrow 120-2 indicates that frame 2 may be configured in a like manner. Frame 1 further includes two network modules, namely network module 1 (140) and network module 2 (145) (sometimes referred to as a Frame Link Module (FLM)). Frame 2 also include two network modules, namely network module 3 (150) and network module 4 (155). These network modules provide connectivity for the compute resources represented by the respective blades within their frame. Each of the blades is shown with a network connection to a network switch 160 respectively disposed within each individual network module (e.g., network module 1 (140) through network module 4 (155)). Each network module further includes a CPU 165 to facilitate configuration, monitoring, and maintenance of a corresponding network switch 160.

Connectivity from a set of frames to a customer network is typically provided by a single active uplink 125 from one of the plurality of network switches that exist across the multiple FLMs of a group of connected frames. That is, all communications external to the group of connected frames passes through uplink 125. Other potential uplinks 126-1, 126-2, and 126-3 are illustrated to be available (e.g., if needed as a result of failure to uplink 125) from other network switches.

As further illustrated in computer infrastructure 100, customer network VLAN 130 connects each of the network switches 160 in an ethernet ring topology network and extends to the customer network 105 (e.g., includes VLANS 1-4094). A second ring network, 4095 management VLAN 135, is also shown as an isolated network in computer infrastructure 100. 4095 management VLAN 135 is shown in a bolder line than customer network VLAN 130 and also connects each of the network switches 160. Note, in a proper configuration of a group of frames, each network switch will be directly connected to each neighboring switch (either in the same frame or an adjacent frame) and no intervening network devices are present.

A virtual LAN (VLAN) refers to a broadcast domain that is partitioned and isolated (i.e., logically isolated) in a computer network at the data link layer (OSI layer 2). LAN is the abbreviation for local area network and when used in the context of a VLAN, "virtual" refers to a physical object recreated and altered by additional logic. A VLAN is a custom network created from one or more existing LANs. It enables groups of devices from multiple networks (both wired and wireless) to be combined into a single logical network. The result is a virtual LAN that can be administered like a physical local area network, for example 4095 management VLAN 135 in computer infrastructure 100.

Referring now to FIG. 2, a simplified view of FIG. 1 is presented as computer infrastructure 200 with certain elements removed for clarity of discussion. Like in FIG. 1, computer infrastructure 200 illustrates four network modules, namely network module 1 (240), network module 2 (245), network module 3 (250), and network module 4 (255). Also, each network module is illustrated to include a CPU 250 and a network switch 260 (along with control software not illustrated). In some implementations, each CPU 260 may have a CPU management port 251 (illustrated as a bolded communication path) that is connected to the corresponding network switch. Using the CPU management port 251, the CPU 260 may configure the switch with the appropriate configuration (which may change over time). The CPU 260 may also run (e.g., execute) the G.8032 management network software (e.g., software to manage the ring network) and communicate with other ring network modules (and CPUs) via network management VLAN 4095 (235).

As further illustrated in FIG. 2, each network switch 260 is shown to have a left and a right link port (i.e., at least two ports) that connect to other network modules (240, 245, 250, and 255). As in FIG. 1, it may be desirable for the left and right link ports to connect directly to a next upstream and downstream network module within the ring topology and not have any intervening devices between network modules (240, 245, 250, and 255).

In some disclosed implementations for automatic ring owner selection upon failure, each network module runs the CCP protocol. Note the CCP messages illustrated as traveling on network management VLAN 4095 (235). Each network module continuously sends a number of packets at a specified time interval for a specified time period as the above-mentioned point-to-point messages between itself and each of its direct neighbor network modules (240, 245, 250, and 255). This may be thought of as a "heartbeat message" and may be sent at configurable time intervals, for a configurable amount of time, etc. In short, each neighbor network module and the sender network module understand ahead of time how the heartbeat messages are expected to be sent and received. Accordingly, detection of a "missed" heartbeat message may be implemented at each neighbor network module. Specifically, network module 1 (240) may monitor network module 2 (245) and network module 4 (255) but would not monitor network module 3 (250) because network module 3 (250) and network module 1 (240) are not direct neighbors.

Based on the above explanation of heartbeat style messages, if the neighbor network module receives the proper number of packets in the specified time period (e.g., a valid heartbeat), the network link (for that segment of the ring) is declared active. However, if the neighbor network module does not receive the proper number of packets in the specified time period (e.g., heartbeat skipped, missing entirely) the network link (e.g., the network segment between the expectant sender and receiver) may be deemed inactive. In disclosed examples, the G.8032 protocol (or enhanced protocol) may use the CCP link status to determine the state of the network ring. Accordingly, in the event that a network link is disconnected, or a network module has failed (e.g., actual hardware/software failure, stopped, rebooted, etc.), the CCP state may, as a result, become inactive for that link (portion of ring topology). If this condition occurs, the G.8032 state for that link will be in Signal Fail (SF) condition. The SF condition may be maintained with a SF message being sent along that link until the network has returned to a ring configuration. That is, as long as a portion of the ring is in SF condition, network modules directly connected to that link will continue to send an SF message until the failed link portion is restored.

Figure 3A:
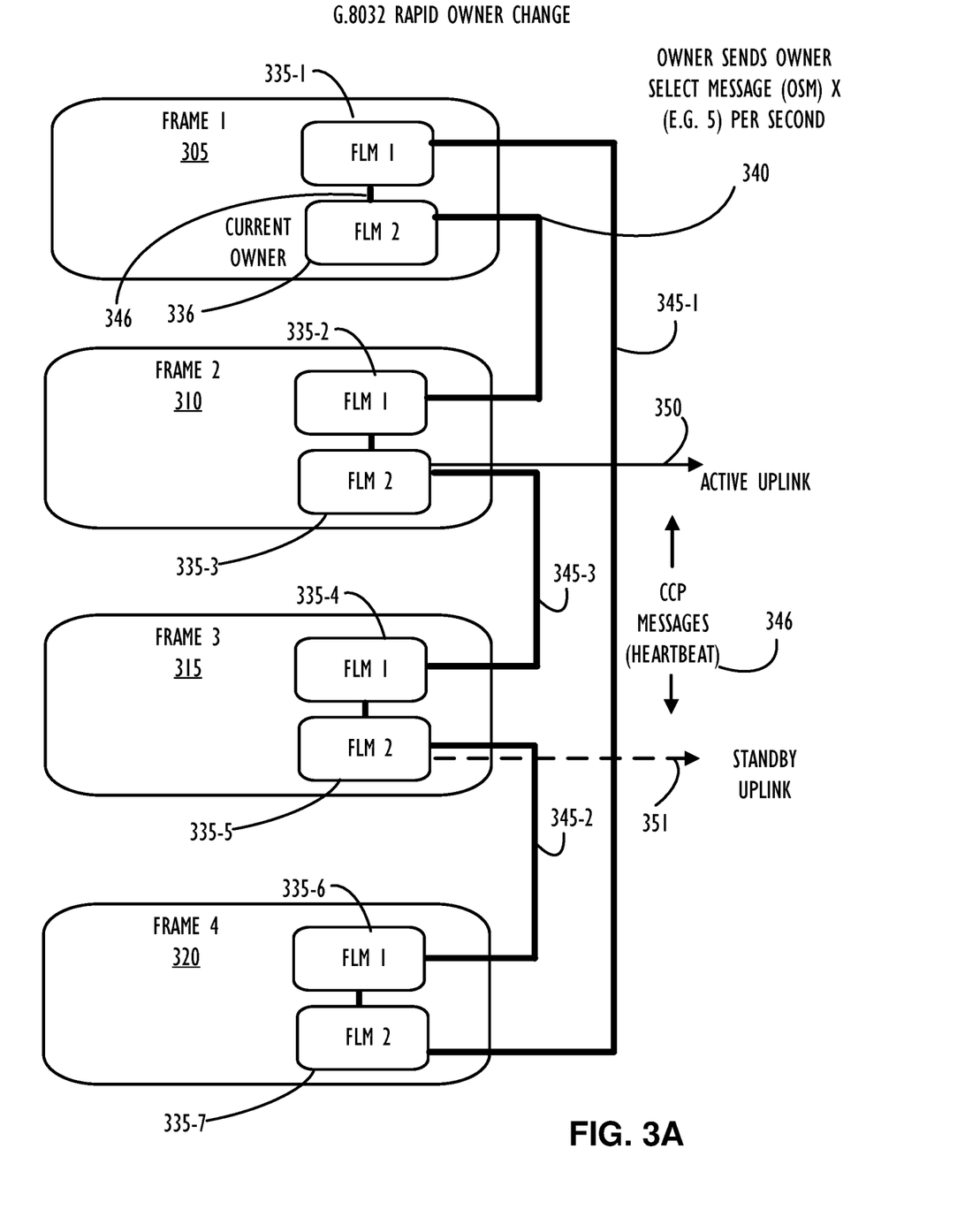
FIG. 3A is a functional block diagram illustrating communication flow across a ring topology network with a ring owner for multiple frames, according to one or more disclosed implementations.

Referring now to FIG. 3A, four frames are illustrated. Frame 1 (305) is illustrated to have two FLMs, namely FLM 1 (335-1) and FLM 2 (336). Frame 2 (310) is illustrated to have two FLMs, namely FLM 1 (335-2) and FLM 2 (335-3). Frame 3 (315) is illustrated to have FLM 1 (335-4) and FLM 2 (335-5). Frame 4 (320) is illustrated to have FLM 1 (335-6) and FLM 2 (335-7). Note that FLM 2 (336) of Frame 1 (305) is designated in this example as the current ring owner.

In this example, a ring topology management network is illustrated to transmit CCP messages (e.g., heartbeats) 346 across a management network (e.g., a management network VLAN such as that described for FIG. 1) composed of multiple link segments. Specifically, link segment 345-1 connects FLM 1 (335-1) of frame 1 (305) to FLM 2 (335-7) of frame 4 (320); link segment 345-2 connects FLM 1 (335-6) of frame 4 (320) to FLM 2 (335-5) of frame 3 (315); link segment 345-3 connects FLM 1 (335-4) of frame 3 (315) to FLM 2 (335-3) of frame 2 (310); and link segment 340 connects FLM 1 (335-2) of frame 2 (310) to FLM 2 (336) of frame 1 (305). Also note that each FLM within a frame is connected to each other with a link segment 346 (labeled only in frame 1 305 for clarity of presentation). Note that in this example the outbound link segments from the current owner (i.e., FLM 2 (336) of frame 1 (305)) are link segment 346 and link segment 340.

The topology of FIG. 3A further includes an active uplink 350 supported by FLM 2 (335-3) of frame 2 (310) and a standby uplink 351 (illustrated as a dashed line arrow) supported by FLM 2 (335-5) of frame 3 (315). In this example configuration, the current owner (i.e., FLM 2 (336) of frame 1 (305)) may be configured to send (e.g., transmit) an owner select message (i.e., using OSM protocol mentioned above) at a configurable number of times (e.g., 5) per second. That is, the owner will broadcast its presence to its directly connected neighbors and all network link modules (e.g., FLMs) will be aware that the owner is active (e.g., because of received OSM messages that traverse the ring entirely a single time (of course if the ring topology is complete and functioning properly).

Figure 3B:
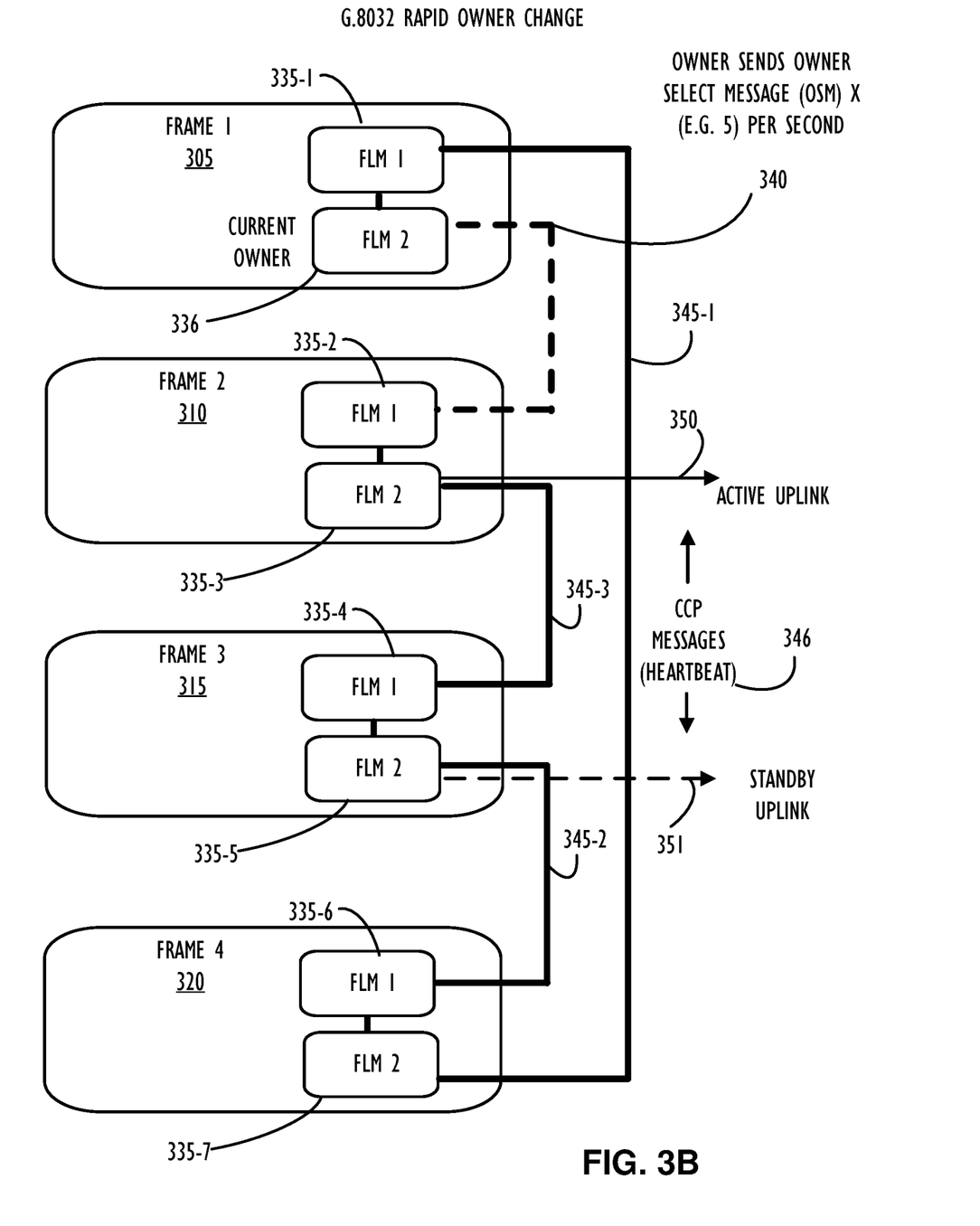
FIG. 3B is a functional block diagram used to illustrate ring ownership failure and automatic selection of a new ring owner for multiple frames, according to one or more disclosed implementations.
Figure 3C:
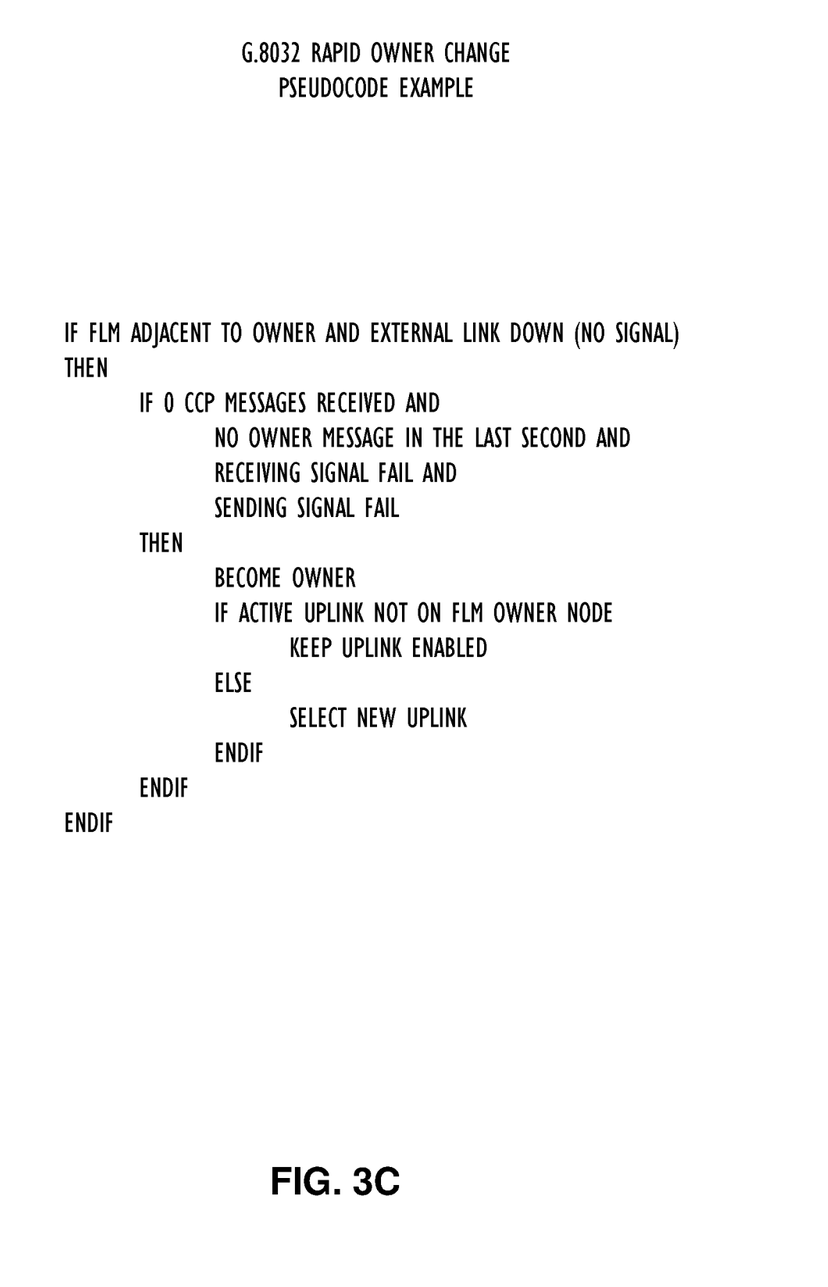
FIG. 3C illustrates a sample of pseudo-code that may be used to implement an automatic new ring owner selection, according to one or more disclosed implementations.
Figure 3D:
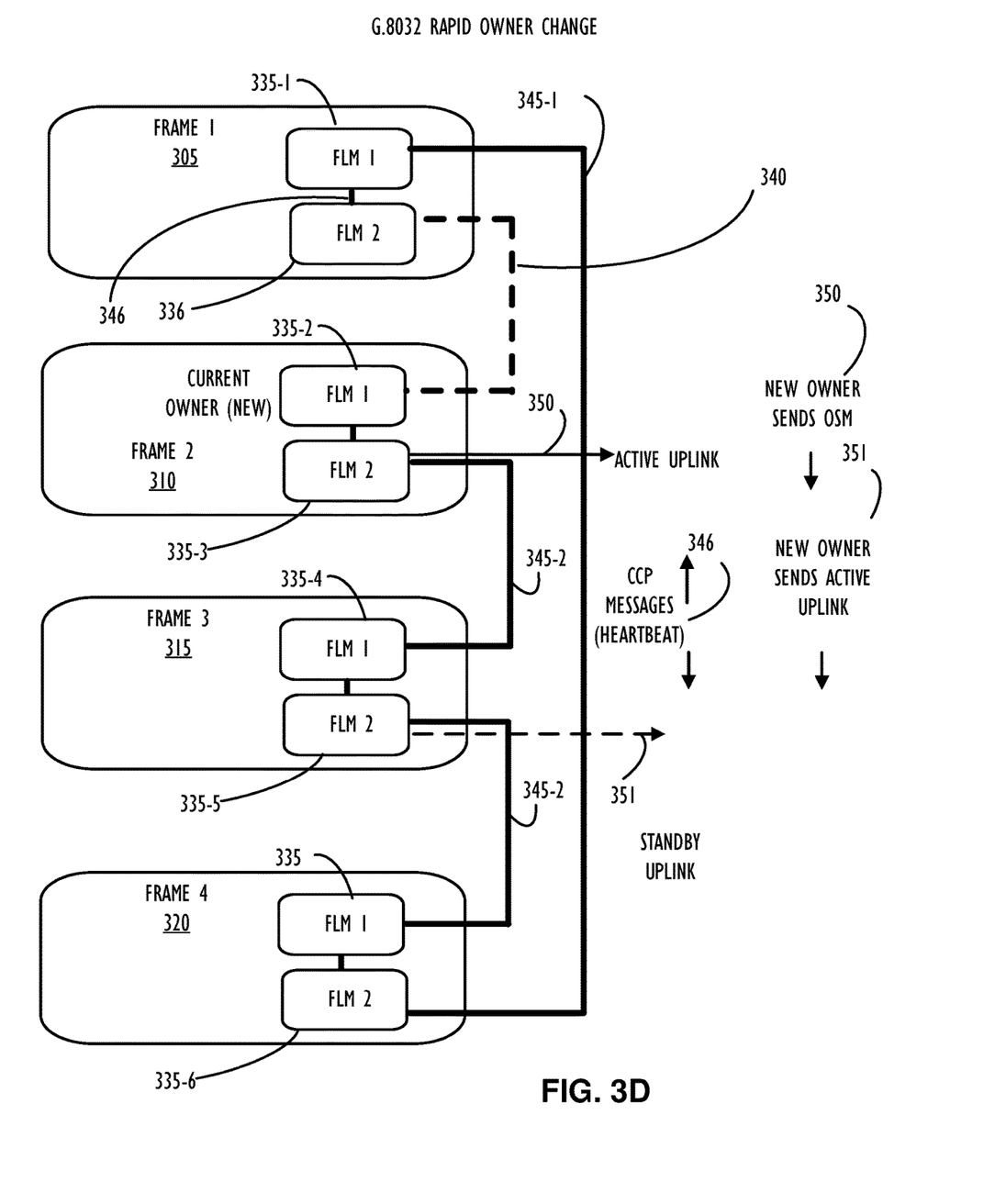
FIG. 3D is a function block diagram used to illustrate ring owner transition based on the example of FIG. 3B and the pseudo-code of FIG. 3C, according to one or more disclosed implementations.

To further automatic ring owner designation with reference to FIGS. 3B-3D, the ring owner (FLM 2 336) sends CCP messages to its immediate neighbors via link segment 346 and link segment 340. In this example, the message contains the media access control (MAC) address of the owner. The current ring owner also sends a periodic message to nodes in the ring stating who the current ring owner is and a separate message of what node has the active uplink (in this example, FLM 2 (335-3)). Each node in the rings records the owner MAC address and the MAC address of the active uplink.

To facilitate automatic ownership selection upon failure, the node that is connected to the external link (i.e., link to an adjacent frame—which is link segment 340 in this example) of the ring owner is designated (in this example implementation) as the secondary owner. Thus, if the primary ring owner is removed from the ring (or reboots), the secondary ring owner becomes the primary ring owner. This external link is illustrated as a dashed line for link segment 340 in FIG. 3B.

According to this example implementation, there are three conditions for the secondary ring owner to become the primary ring owner. These conditions are also illustrated with sample pseudo-code in FIG. 3C. Specifically, the three conditions that are detected, in this example, to cause automatic failover from a primary ring owner (current ring owner) to a secondary ring owner (an adjacent network module to the current ring owner in a different frame) are: 1. The secondary ring owner stops receiving CCP messages from the current ring owner; 2. The secondary ring owner does not receive an owner message for one second (or a configurable amount of time); and 3. The FLM that is the secondary ring owner enters a Signal Fail condition because its external link to an adjacent frame is down.

According to one or more disclosed implementations, when these three conditions occur at or near the same time, the secondary ring owner becomes the primary ring owner as illustrated by the current owner (new) designation for FLM 1 (335-2) of Frame 2 (310) as shown in FIG. 3D. Additionally, the new owner (after assuming this role) will start transmitting the OSM message with its MAC address as the ring owner (350). As mentioned above, the new ring owner already had saved the current active uplink MAC address so the new ring owner may immediately begin transmitting the active uplink message also. In a situation where the active uplink was also on the node of the previous ring owner the new ring owner will initiate selection of a new active uplink when it does not receive any heartbeat messages. Also note, that if the external link is disconnected between the primary ring owner and the secondary ring owner (again link 340) it is possible that no change in ownership will take place. This is because, if only the external link has failed and the secondary owner continues to receive OSM messages (e.g., via the other direction on the ring) from the primary ring owner. The secondary ring owner will know from these OSM messages received from the primary ring owner (current ring owner stating it is the owner) that not all three conditions have been satisfied so no automatic change in ownership role should be initiated.

The disclosed techniques represent several benefits to improve the art of system administration and improve the functioning of the overall scalable compute resource. These benefits include, but are not limited to, elimination of manual intervention; and a rapid owner switch enables the ring to maintain an uplink to the external network. In a case where the active uplink cannot be maintained, recovery of the ring topology is increased even further, in part, because selecting a new uplink happens sequentially after restoring the ring owner designation. Thus, the downtime of the scalable compute resource may be time to initiate new ring owner plus time to select new uplink as opposed to disclosed automatic and fully automated techniques which essentially reduce this process to a relatively negligible amount of time.

Figure 4:
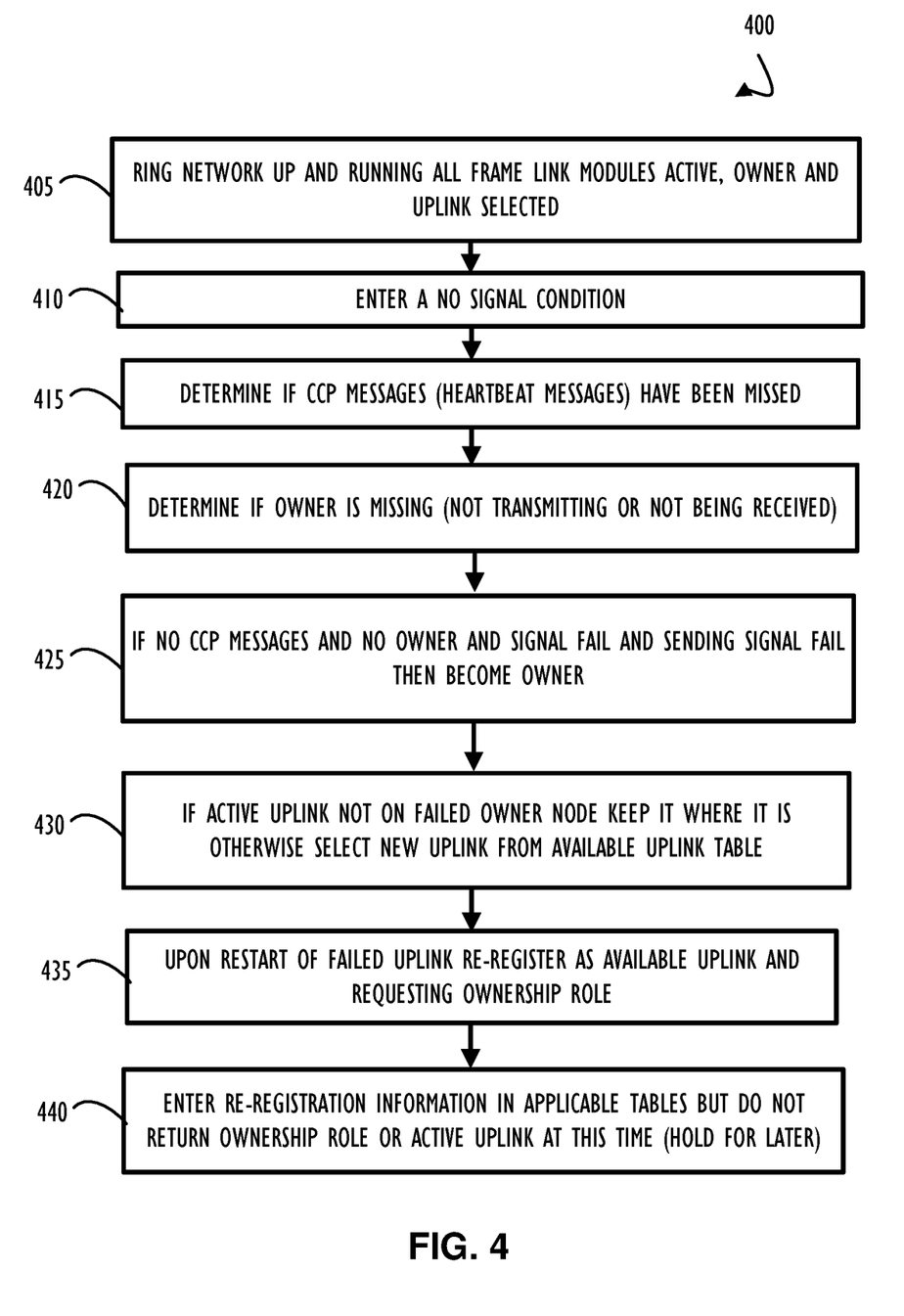
FIG. 4 illustrates a flow chart depicting one example method for providing automatic ring owner selection responsive to a ring owner failure, according to one or more disclosed implementations.

FIG. 4 represents an example method 400 for providing automatic ring owner selection in response to a detected failure of a current ring owner, according to one or more disclosed examples. FIG. 4 illustrates method 400 which begins at block 405 with a ring network operational and including a ring owner and an active uplink established. Block 410 indicates that a no signal condition may be entered. This condition (also known as the above-mentioned SF condition) may be caused by a ring owner being rebooted, disconnected, failing, losing power, etc. In any case, the no signal condition may be detected based, in part, on one or more heartbeat messages not being properly received (block 415) at one or both neighbor network modules. As mentioned above, entering the no signal condition may cause each neighboring network module to begin transmitting an SF signal on the portion of the link that has experienced a suspected failure. Block 420 indicates that a determination may be made as to if the owner of the ring (i.e., the current owner at time of suspected failure) is not available. Block 425 indicates that if no CCP messages have been received, no owner is available, signal fail condition is active, and this network module is actively sending signal fail messages, then become the ring owner. That is, a network module, based on all the above conditions being as stated, may attempt to take over the ring owner role for the scaleable compute resource.

Continuing with FIG. 4, block 430 indicates that if the active uplink was not on the same network module that has been determined to have failed (i.e., the previous ring owner), then leave the active uplink in place. Alternatively, if the active uplink was also on the network module determined to have failed, select a new active uplink (e.g., select from an available uplink table that was previously shared amongst network modules of the ring). Block 435 indicates that, upon restart of the failed network module (previous owner) that network module may re-register both as an available uplink and request a future ownership role. Block 440 indicates that re-registration information may be populated in applicable tables and shared around the ring for future use. Note that the previous owner is not automatically returned to its ownership role upon restart.

As will be clear to those of ordinary skill in the art, having the benefit of this disclosure, the disclosed technique for automatic ring ownership selection represents an improvement to the functioning of the scaleable compute resource. In previously available systems, manual intervention may have been an element of transitioning to a new ring owner or the ring may have simply not returned to full service until a restart of the previous ring owner had completed. In either case, an impaired network condition with an unavailable owner would likely have resulted in degraded functionality (for an undetermined period of time) for the scalable compute resource.

Figure 5:
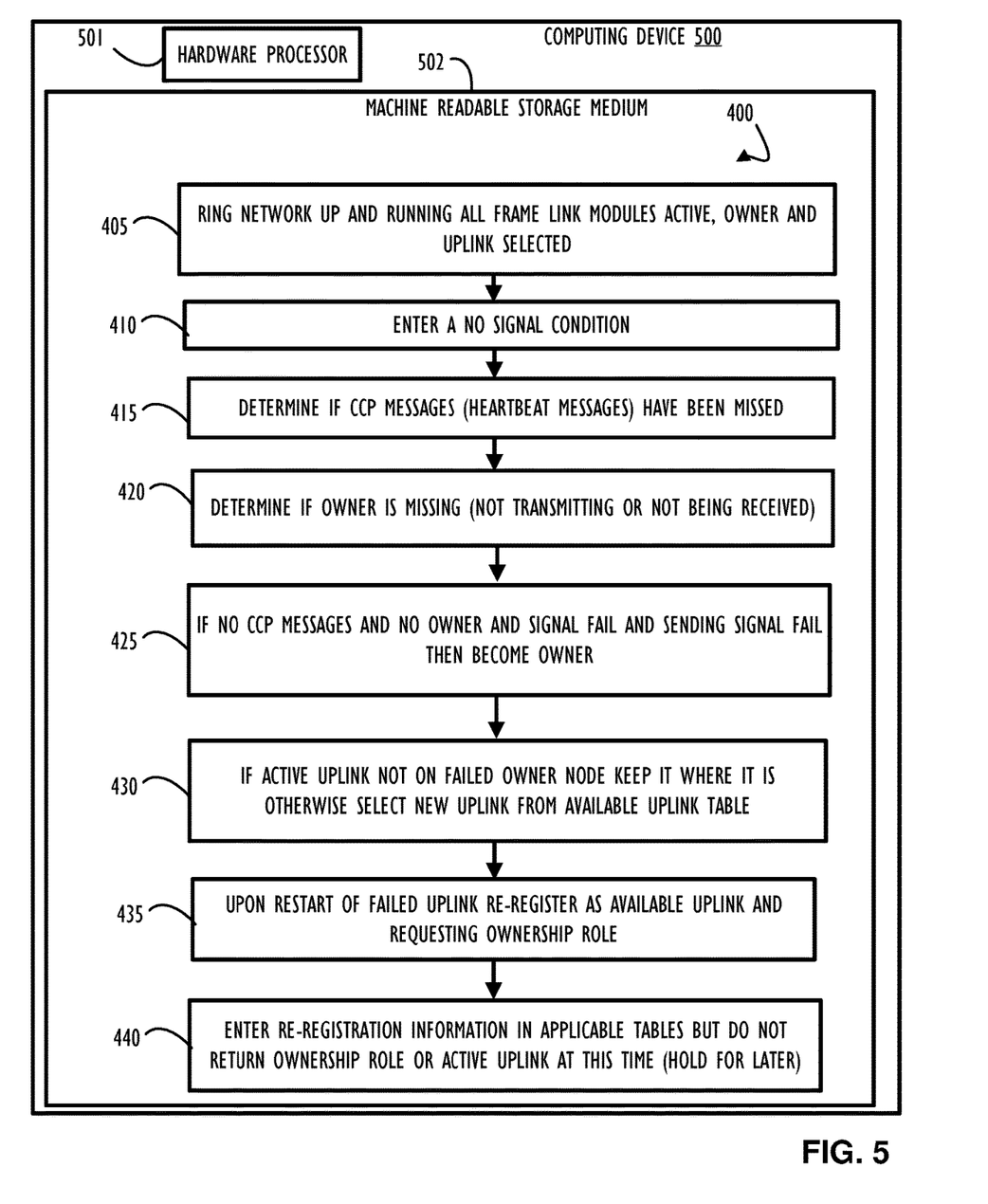
FIG. 5 illustrates an example computing device instrumented with computer instructions to perform the method of FIG. 4, according to one or more disclosed examples.

FIG. 5 is an example computing device 500, with a hardware processor 501, and accessible machine-readable instructions stored on a machine-readable medium 502 for implementing one example temporally aware procurement/deployment system, according to one or more disclosed example implementations. FIG. 5 illustrates computing device 500 configured to perform the flow of method 400 as an example. However, computing device 500 may also be configured to perform the flow of other methods, techniques, functions, or processes described in this disclosure. In this example of FIG. 5, machine-readable storage medium 502 includes instructions to cause hardware processor 501 to perform blocks 405-440 discussed above with reference to FIG. 4.

A machine-readable storage medium, such as 502 of FIG. 5, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method for automatically determining a new ring owner based on failure of a current ring owner within a ring topology network, the method comprising:
receiving, by a processing unit, one or more Ownership Select Messages (QSMs) from a first node which comprises the current ring owner, wherein the one or more QSMs are transmitted by the first node to adjacent nodes of the first node, and wherein the ring topology network comprises a plurality of nodes;
detecting, by the processing unit, a first absence of an expected Ownership Select Message (OSM) from the first node which comprises the current ring owner;
receiving, by the processing unit, one or more Continuity Check Protocol (CCP) messages from the first node which comprises the current ring owner, wherein the one or more CCP messages are transmitted by the first node to the adjacent nodes of the first node;
detecting, by the processing unit, a second absence of at least one expected Continuity Check Protocol (CCP) message from the first node which comprises the current ring owner;
designating a first adjacent node of the first node as a proposed new ring owner, wherein the first adjacent node is connected to the first node via an external link of a management network associated with the ring topology network; and
initiating, by the processing unit, an assumption of a ring ownership role for the proposed new ring owner responsive to detecting the first absence and the second absence for an overlapping period of time.

2. The computer-implemented method of claim 1, wherein:
detecting the first absence comprises determining that no OSM has been received for a first configurable amount of time.

3. The computer-implemented method of claim 1, wherein:
detecting the second absence comprises determining that no CCP messages have been received for a second configurable amount of time.

4. The computer-implemented method of claim 1, wherein:
detecting the first absence comprises determining that no OSM has been received for a first configurable amount of time; and
detecting the second absence comprises determining that no CCP message has been received for a second configurable amount of time.

5. The computer-implemented method of claim 4, wherein the second configurable amount of time is less than the first configurable amount of time.

6. The computer-implemented method of claim 5, wherein the first configurable amount of time is less than or equal to one second.

7. The computer-implemented method of claim 1, wherein the OSM and the CCP messages are provided on a management VLAN of a scaleable compute resource, the management VLAN segregated from a customer data network supported by the scalable compute resource.

8. The computer-implemented method of claim 1, wherein the OSM and the CCP messages are provided as heartbeat messages that are expected by both the sender and receiver to be sent and received periodically at pre-determined intervals of time.

9. The computer-implemented method of claim 1, further comprising:
assuming, by the processing unit, the ring ownership role for the proposed new ring owner, in part, by:
transmitting an OSM message identifying the proposed new ring owner as having the ring ownership role.

10. The computer-implemented method of claim 1, further comprising:
determining, by the processing unit, that the proposed new ring owner is in a signal fail (SF) condition prior to assuming the ring ownership role for the proposed new ring owner.

11. The computer-implemented method of claim 1, further comprising:
determining, by the processing unit, whether an active uplink for the scaleable compute resource is designated as being provided by the current ring owner;
responsive to a determination that the active uplink is on the current ring owner, initiating a new uplink selection process; and
responsive to a determination that the active uplink is not on the current ring owner, maintaining the active uplink in place for the scaleable compute resource.

12. A non-transitory computer readable medium comprising computer executable instructions that, when executed by one or more processing units, cause the one or more processing units to:
detect a first absence of an expected Ownership Select Message (OSM) from a current ring owner;
detect a second absence of at least one expected Continuity Check Protocol (CCP) message from the current ring owner;
determine that the current ring owner is an adjacent network module of a proposed new ring owner connected to the proposed new ring owner via an external link of a management network; and
initiate an assumption of a ring ownership role for the proposed new ring owner responsive to detecting the first absence and the second absence for an overlapping period of time.

13. The non-transitory computer readable medium of claim 12, further comprising computer executable instructions that, when executed by one or more processing units, cause the one or more processing units to:
determine that the proposed new ring owner is in a signal fail (SF) condition prior to assuming the ring ownership role for the proposed new ring owner.

14. The non-transitory computer readable medium of claim 12, further comprising computer executable instructions that, when executed by one or more processing units, cause the one or more processing units to:
detect the first absence by determining that no OSM has been received for a first configurable amount of time; and detect the second absence by determining that no CCP message has been received for a second configurable amount of time.

15. A network node in a ring network, the network node comprising:
   a data storage to store information pertaining to a ring ownership role designation and an uplink assignment with respect to a plurality of nodes within the ring network;
   a plurality of ports to send and receive messages in the ring network; and
   a hardware controller, wherein the hardware controller is to:
      detect a first absence of an expected Ownership Select Message (OSM) from a current ring owner;
      detect a second absence of at least one expected Continuity Check Protocol (CCP) message from the current ring owner;
      determine that the current ring owner is an adjacent network module of the network node that is connected to the network node via an external link of a management network; and
      initiate an assumption of the ring ownership role for the network node responsive to detecting the first absence and the second absence for an overlapping period of time.

16. The network node of claim 15, wherein the network node is disposed within a first frame of a scaleable compute resource.

17. The network node of claim 16, wherein the external link of the management network comprises a link to an adjacent frame of the first frame with respect to a topology of the ring network.

18. The network node of claim 15, wherein the hardware controller is further to:
   determine that the network node is in a signal fail (SF) condition prior to initiating assumption of the ring ownership role.

19. The network node of claim 18, wherein the hardware controller is further to:
   transmit an OSM message identifying the network node as having the ring ownership role.

20. The network node of claim 19, wherein the hardware controller is further to:
   determine whether an active uplink for a scaleable compute resource is designated as being provided by the current ring owner;
   responsive to a determination that the active uplink is on the current ring owner, initiate a new uplink selection process; and
   responsive to a determination that the active uplink is not on the current ring owner, transmit a message with an indication to maintain the active uplink in place for the scaleable compute resource.

* * * * *